United States Patent [19]

Butler et al.

[11] Patent Number: 5,671,597
[45] Date of Patent: Sep. 30, 1997

[54] LOW NO<sub>X</sub> FUEL NOZZLE ASSEMBLY

[75] Inventors: Aaron S. Butler, Ledyard; Thomas J. Madden, Vernon, both of Conn.

[73] Assignee: United Technologies Corporation, Hartford, Conn.

[21] Appl. No.: 363,189

[22] Filed: Dec. 22, 1994

[51] Int. Cl.$^6$ ........................................... F02C 7/20
[52] U.S. Cl. .................. 60/39.31; 60/737; 60/748; 60/740; 239/419; 239/472
[58] Field of Search ................... 60/39.31, 737, 60/740, 743, 748; 239/419, 427, 431, 472

[56] References Cited

U.S. PATENT DOCUMENTS 3,961,475   6/1976   Wood ........................................ 60/39.65
5,307,634   5/1994   Hu ............................................... 60/737
5,402,633   4/1995   Hu ............................................... 60/737
5,479,773   1/1996   McCoomb et al. ....................... 60/748

FOREIGN PATENT DOCUMENTS 0542044   5/1993   European Pat. Off. .
2140401   3/1973   Germany .
2633387   2/1977   Germany .
624768   6/1949   United Kingdom .

*Primary Examiner*—Charles G. Freay

[57] ABSTRACT

A low NO$_x$ fuel nozzle assembly 10 includes a nozzle 24 with a tangential entry (TE) swirler 46 and centerbody element 48 each releasably mounted to an assembly support structure 26, such as to readily provide for operator access to the nozzle's major elements for the purpose of repair or replacement.

4 Claims, 4 Drawing Sheets

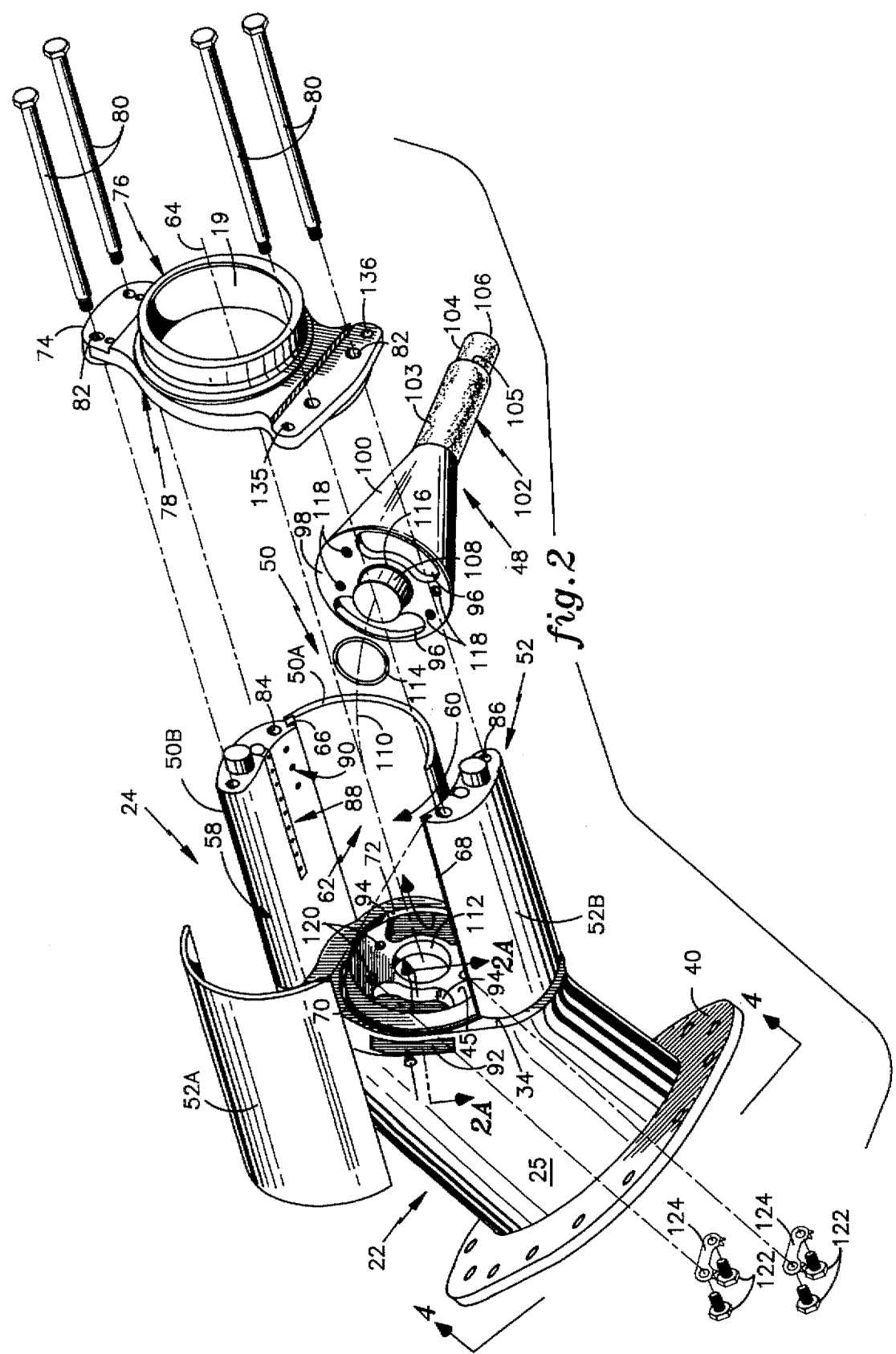

LOW $NO_x$ FUEL NOZZLE ASSEMBLY

DESCRIPTION

1. Technical Field

The present invention relates to industrial gas turbine engines, and more particularly to Low $NO_x$ Fuel Injectors for use therein.

2. Cross Reference to Related Applications

Some of the subject matter disclosed and/or claimed herein is also disclosed in a commonly owned, co-pending application of the same assignee, entitled "*Pressure Vessel Fuel Nozzle Support for an Industrial Gas Turbine Engine*", U.S. Ser. No. 08/267,102, filed Jun. 24, 1994 now U.S. Pat. No. 5,564,271.

3. Background Art

It is well known in the art to use gas turbine engines in industrial applications to generate electrical energy. These land-based gas turbine engines, however, are subject to environmental regulations governing emission controls for combustion engines. The most stringent regulation is that limiting the constituent levels of nitrous oxide ($NO_x$) in the engine exhaust gases. It is also known to use low $NO_x$ nozzles to dilute engine fuel with air to produce lean fuel mixtures in an attempt to reduce these emissions. However, United States regulations now generally limit $NO_x$ emissions from land based gas turbines using natural gas to 25 parts per million (PPM). This requires increasingly sophisticated nozzles which, in turn, require repair and adjustment.

Industrial gas turbine engines may be loosely grouped in one of two configuration classes: aeroderivative, or frame-type. Frame-type engines are developed principally for land based operation, where size and weight considerations are much less important than in the case of flight engines, and where product design consideration is given to field maintainability of the engine. The result is that frame-type engines more greatly facilitate operator access to the engine's critical wear components while the engine is installed on site.

An aeroderivative engine is a "version" of an original flight engine. Flight engines have higher pressure ratios which give the aeroderivative engine an efficiency advantage over a frame type engine in simple cycle applications, but higher pressure ratios sometimes leads to higher air temperatures at the engine's combustor inlet. Since $NO_x$ formation is a result of high temperatures in the flame zone of the combustor, these pockets of higher inlet temperature can cause $NO_x$ emissions.

The fundamental design of the aeroderivative is fixed to its parent flight engine. Although some changes can and are made to the flight design in creating the aeroderivative, such as smaller diameter fan stages to lower air pressure, these design changes are necessarily limited and produce only small parametric changes in engine characteristics. As a result, the lowering of $NO_x$ emissions presents a greater challenge in the aeroderivative engine and may require more frequent operator access to the engine's combustor stage elements. Similarly, the aeroderivative engine's flight design compactness makes site maintenance more difficult and may limit opportunities for adding new elements within the existing engine configuration envelope to either reduce engine temperatures or to further boost $NO_x$ emission control efficiency. Notwithstanding these issues, the performance and high efficiency ratings for these aeroderivative engines has established them as the largest installed base of industrial gas turbines.

DISCLOSURE OF THE INVENTION

The object of the present invention is to provide a novel configuration for a low $NO_x$ nozzle assembly which allows for easy disassembly and replacement of the nozzle's major elements. A further object of the present invention is to provide a low $NO_x$ nozzle assembly for use in an industrial gas turbine engine, and which is capable of being field serviced by an operator at its installed site.

According to the present invention, a low $NO_x$ nozzle assembly includes a tangential entry (TE) scroll swirler removably mounted to a support fixture having a housing with an interface surface at one end for receiving the scroll swirler and a housing mounting surface at a distal end thereof, the scroll swirler comprising a centerbody positioned axially within the mixing chamber of a TE assembly formed by an endcap and a pair of arc scrolls, the endcap including an outlet aperture disposed in axial registration with the mixing chamber and having a first diameter, the TE assembly being removably engaged to a circumferential region of the interface surface and the centerbody being removably engaged, separate from the TE assembly, to a central region of the interface surface.

In further accord with the present invention, the centerbody comprises an axially arrayed structure having a base plate, an opposite side surface of which includes a stub shaft extending axially from a central portion thereof and adapted to be removably inserted into a mating central aperture of the interface surface, to provide axial registration of the centerbody with the mixing chamber. In still further accord with the present invention, the opposite side surface of the base plate further includes at least one threaded hole disposed therein which, with the centerbody stub shaft inserted into the interface mating aperture, is positioned in registration with a mating pass-through hole disposed in the interface, each threaded hole adapted to releasably engage threaded bolts received therein, whereby the centerbody may be releasably engaged to the interface by threaded bolts passing through the interface mating holes into the base plate threaded holes.

The present low $NO_x$ nozzle assembly provides a novel configuration which allows for easy disassembly and replacement of nozzle elements. The centerbody component is easily disassembled from the scroll swifter through removal of the threaded bolts, which are operator accessible through the support structure housing. This greatly facilitates operator maintenance of the nozzle and permits the site maintenance of installed nozzle assemblies, including the replacement of critical wear nozzle components.

These and other objects, features and advantages of the present invention will become more apparent in light of the following detailed description of a best mode embodiment thereof, as illustrated in the accompanying Drawing.

BRIEF DESCRIPTION OF THE DRAWING

FIG. 2 is an exploded, perspective view of the low $NO_x$ nozzle of FIG. 1;

FIG. 2b is an exploded view of FIG. 2a.

BEST MODE FOR CARRYING OUT THE PRESENT INVENTION

Figure 1:
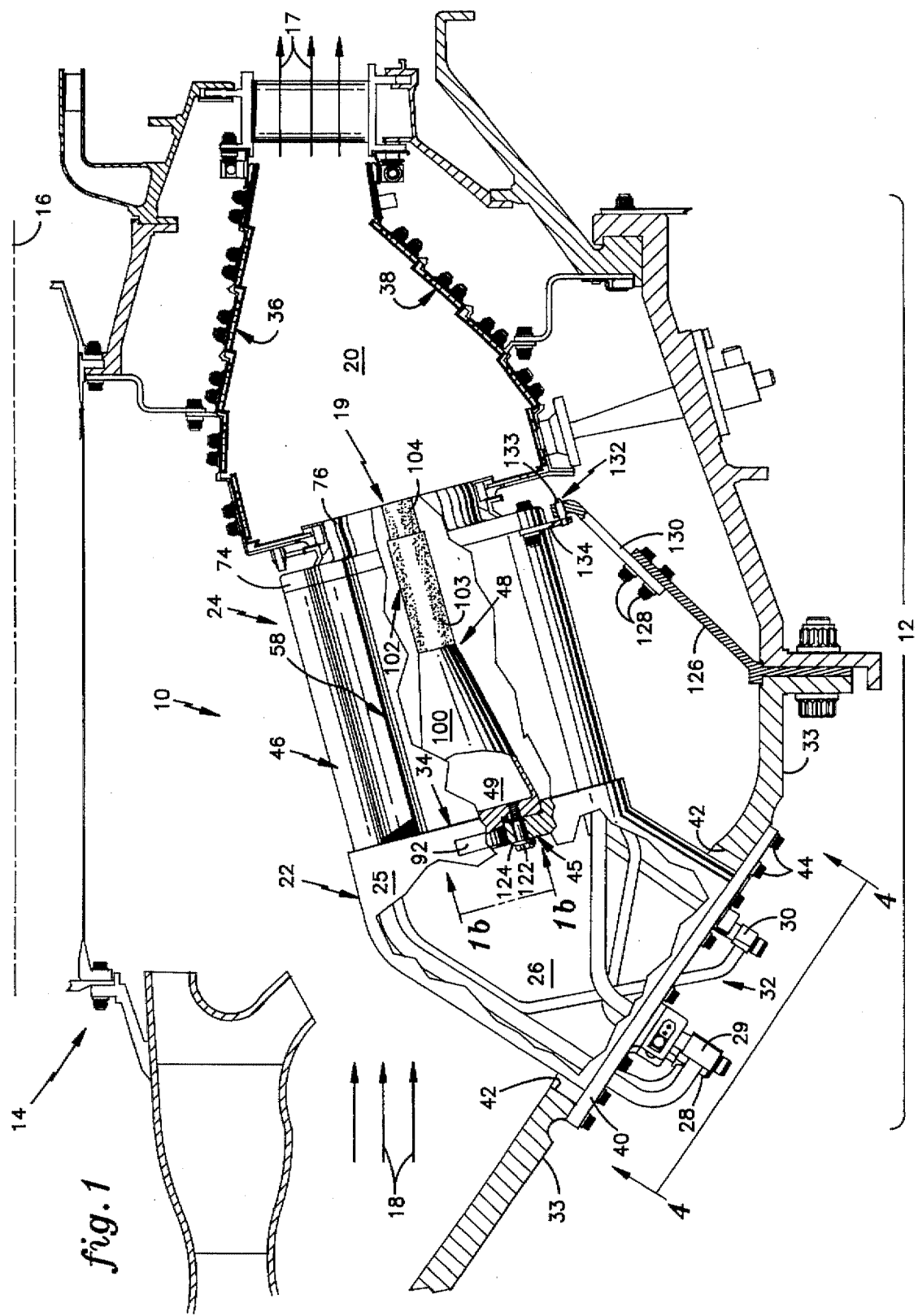
FIG. 1 is a simplified, partially sectioned, elevated view of the low $NO_x$ fuel nozzle assembly of the present invention installed in an industrial gas turbine engine.

FIG. 1 illustrates, in elevated partial section, the installation of the present low $NO_x$ nozzle assembly 10 in the combustor stage 12 of a model FT8® industrial gas turbine engine 14. The engine is manufactured by the Turbo Power & Marine Division of United Technologies Corporation ("United"), and FT8 is a registered trademark of United. The model FT8 is a 25 megawatt engine comprising a two-spool gas generator connected to a power turbine, and it is derived from the JT8D aircraft engine manufactured by United's Pratt & Whitney Division. FIG. 1 only depicts the FT8 engine's combustor stage and, for teaching purposes, the illustration has been simplified to show only one of the sixteen low $NO_x$ nozzle assemblies installed radially about the engine axis 16. Furthermore, for clarity of illustration, FIG. 1 omits those engine details that are not material to an understanding of the invention.

In the FT8 engine embodiment, the low $NO_x$ nozzle assembly 10 reduces constituent levels of nitrous oxide in the engine's exhaust combustion gases 17 by mixing engine fuel with the high temperature compressed air 18 from the engine's compressor stage (not shown), to provide a low fuel-to-air ratio ("lean") fuel mixture to an inlet 19 of the engine's combustor 20. The assembly includes a support fixture 22 and a low $NO_x$ nozzle 24. The fixture 22 comprises a hollowed housing 25 (shown partially broken away) fabricated from INCO-625 or AMS-5401nickel alloy, and includes an internal cavity 26. Although nickel alloy is preferred, it should be understood that such other materials as may be deemed suitable by those skilled in the art may be used, including high strength stainless steel, cobalt alloys, C230, Russian EP648 or INCO-718. The housing wall thickness may range from 0.100 to 0.500 inches with a preferred wall thickness of from 0.200 to 0.250 inches. The FT8 engine operates on both liquid fuel (aviation fuel) and natural gas (typically methane). The interior cavity 26 allows the engine's fuel lines 28–30 to pass through the housing, from a housing mounting end 32, which connects the housing to the engine wall 33, to a nozzle mounting end 34 connected to the nozzle 24. The housing acts as a conduit for the fuel lines, thereby minimizing exposure of the ambient temperature fuel to the high temperatures and pressures of the compressed air 18 (typically 850° F. and 300 psi) at the housing exterior. This permits use of uninsulated fuel lines without fear of fuel line coking (i.e. plaque formation caused by a chemical reaction of the lower temperature fuel to the high temperature compressed air).

The FT8 engine configuration requires that the housing have the illustrated "elbow" contour in which the plane of each of the ends 32, 34 are angled relative to each other, to provide registration of the nozzle 24 with the combustor inlet 19. In each engine application the housing geometry is customized, as necessary to the particular engine configuration, to provide registration of the nozzle with the combustor. Similarly, the FT8 engine combustor 20, shown in FIG. 1 as the volume between an inner annular wall 36 and an outer annular wall 38, is a single annular combustor comprising the interstitial volume between different diameter (inner and outer). The wall 36 is a section of the smaller diameter, inner burner liner, and the wall 38 is a section of the larger diameter outer liner.

The housing mounting end 32 includes a flange 40 or other equivalent element for rigidly fixing the position of the housing in an opening 42 in the engine wall 33. The flange 40 is adapted so as to be capable of being removably mounted to the engine wall exterior with fasteners 44. These fasteners may comprise metal bolts, as shown, or any known equivalents thereof which allow for operator removal of the housing from the engine casing. The nozzle mounting end 34 includes a mating surface, or interface 45, which is adapted to receive the nozzle 24 in a releasable engagement manner. The interface is further described herein-after with respect to FIG. 2.

Figure 3:
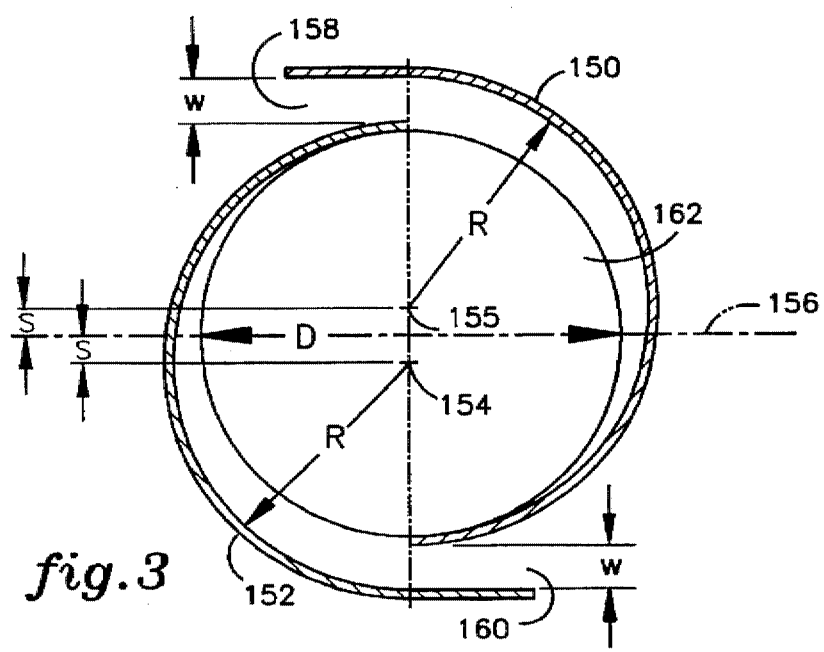
FIG. 3 is a figurative, schematic illustration used in a description of the structural characteristics of the fuel nozzle of FIG. 1.

The major nozzle elements include an air scroll swirler 46 and a centerbody element 48 with central cavity 49. The scroll swirler 46 is a known "tangential entry"type which imparts maximum tangential momentum to the engine compressed air as it enters the nozzle's mixing chamber. FIG. 3, which is not to scale, illustrates the principal of a scroll swirler in a simplified schematic diagram intended for teaching purposes only. A typical swirler comprises cylindrical are scrolls 150, 152, which are half cylinders with a radius (R) and which are positioned with their arc centers 154, 155 offset a distance (S) from the swirler's center as shown in FIG. 3 156. The offset causes the half cylinders 150, 152 to form rectangular slots 158, 160 having a width (W) and a length (L) substantially equal to the length of the swirler body. The slots create a tangential entry path for the compressed air into a cylindrical chamber 162 formed internal of the half cylinders.

Figure 2A:
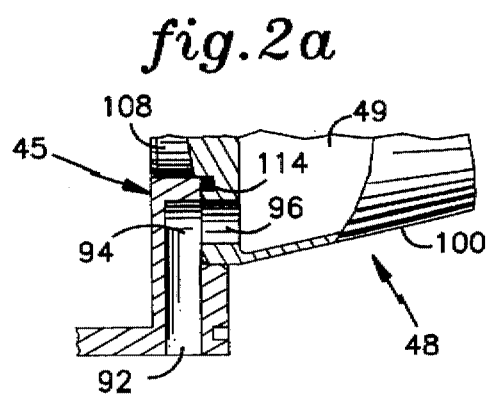
FIG. 2a is a sectioned view of a portion of the nozzle of FIG. 2.
Figure 2B:
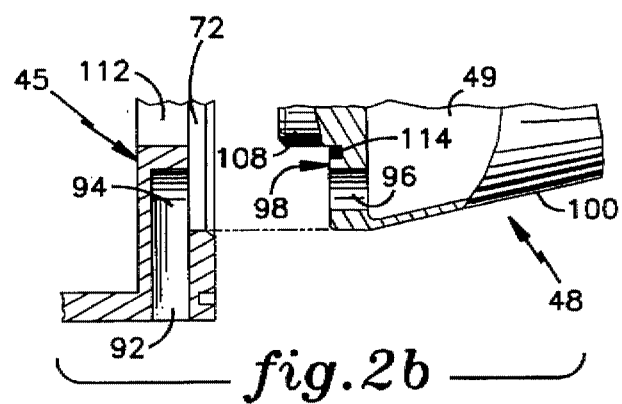

Referring now to FIG. 2, in an exploded perspective view of the present nozzle assembly the arc scrolls 50, 52 of the swirler 46 are segmented into partial cylinder sections 50A, 52A connected to mating manifold assemblies 50B, 52B. The joined elements 50A–50B and 52A–52B form the half cylinder geometry of the scrolls 50, 52, which is substantially similar to the half cylinders 150, 152 of FIG. 3. Similarly, the scrolls 50, 52 form tangential entry slots 58, 60 and the nozzle mixing chamber 62, each generally corresponding to the slots 158, 160 and cylindrical chamber 162 shown in FIG. 3. The mixing chamber 62 is coaxial with the nozzle axis 64.

Referring simultaneously to FIGS. 1, 2, the manifold assemblies 50B, 52B each have mounting grooves 66, 68 formed therein for receiving the mating cylinder sections 50A, 52A in fitted relationship. The nozzle interface 45 has a plurality of similar mounting grooves 70 formed therein, on an upper surface of the interface, outside of the interface recessed area 72. The grooves are located radially outward from the recess 72; in a circumferential portion of the interface. The grooves 70 have a curvature that compliments that of the cylinder sections 50A, 52A, and are adapted to receive in fitted relationship a curved edge of a corresponding one of the cylinder sections. The nozzle interface and an end cap 74, which has an outlet aperture 76 adapted to engage the inlet 19 of the engine combustor 20 (FIG. 1) and a plurality of mounting grooves formed on its opposite side 78 (not visible) with a curvature similar to that of the interface grooves 70, together in combination positionaly fix the assembled scrolls in the desired tangential entry geometry.

Once secured to the manifolds, the assembled half cylinders may be spot brazed to the manifolds along the grooves 66, 68. This is optional, but may be desirable where the nozzle is exposed to excessive levels of vibration. The TE assembly is secured to the housing 25 with threaded bolts 80 fitted through holes 82 in the end cap and holes 84, 86 in the manifold assemblies 50B, 52B, and they engage threaded holes (not visible) in the interface 45.

The manifold assemblies include internal fuel passages (not visible) which connect to the fuel lines 28–30 passing through the housing 25 (not visible). The manifolds inject the fuel into the mixing chamber 62. Liquid fuel is injected into the chamber through a first plurality of outlet ports 88 and natural gas is injected through a second plurality of holes 90. The fuel is mixed with compressed air 18 injected into the chamber through the tangential entry slots 58, 60. The centerbody 48 itself receives compressed air through one or more air inlets 92 formed in the nozzle end 34 of the housing. As shown in FIG. 2A, in a section taken along the lines 2a—2a of FIG. 2, the inlet 92 communicates through passages 94 in the interface 45 and mating passages 96 formed in the base plate 98 of the centerbody, thereby allowing engine compressed air to flow into the centerbody aperture 49 (FIG. 1).

The centerbody 48 is a removable centerpiece element of the TE assembly's mixing chamber. As disclosed in commonly assigned U.S. Pat. No. 5,307,634 entitled "Premix Gas Nozzle", the tangential entry nozzle creates a characteristic fuel-air swirl pattern that relies on a prescribed chamber geometry in which the cross-sectional area of the chamber generally increases from an upstream position near the interface 45 to a downstream position near the outlet 76. This maintains a high mean axial flow velocity through the chamber so that the residence time of the flow within the chamber 62 is small compared to the auto ignition time of the fuel mixture.

The centerbody provides the required flow path geometry with various centerbody configurations. In the '634 patent the centerbody is substantially that of a cone which extends, from it's base to it's apex, the length (L) of the chamber. In the present embodiment the centerbody shape is substantially that of a frustum 100 combined with a segmented cylinder 102, which includes a major diameter cylinder 103 and a minor diameter cylinder 104 fitted therewithin. The opposite side surface of the centerbody base 98 includes a stub shaft 108 extending from a central position on the base plate surface, between the base air passages 96. The stub shaft 108 is coaxial with the centerbody axis 110, and is adapted to closely fit into, in snug relationship, a mating central aperture 112 formed in the interface 45, coaxial with the nozzle axis 64.

The centerbody structure material is preferably a nickel alloy, such as Inconnel 625, however such other materials, as may be deemed suitable for use in the application by those skilled in the art, may be used. As shown by the stipple shading, the surface of the cylinder segments 103, 104 is coated with a thermal barrier coating to protect the centerbody surfaces closest to the chamber outlet 76 from flame damage which may occur with flashbacks from the combustor 20. Similarly, although not visible in FIG. 2, there is a surface 105 located between the fitted cylinders 103, 104 which includes a plurality of smaller diameter apertures, or ports, which function as outlets for the compressed air flowing through the centerbody aperture 49. The released air flow provides cooling for the surface of the minor diameter cylinder 104. The end surface 106 of the minor diameter (also not visible) also includes a plurality of ports which collectively provide a jet flow of compressed air through the outlet 76. The jet flow provides positional stability to the combustion flames and assists in reducing the occurrence of flashbacks into the mixing chamber.

During installation, the centerbody base 98 is seated within the recess 72 of the interface, with the base stub shaft fitted into the interface aperture 112. A metal "C" seal, or gasket, 114 is fitted over the stub shaft and seated in a recess 116 at the base of the shaft. The seal prevents leakage of the air-swirl mixture back into the housing. FIG. 2A shows the stub shaft and seal 114 seated in the interface aperture. The relative dimensions of the base, the stub shaft, the interface aperture, and the interface recess are selected to provide for snug fitting of the centerbody to the interface and thereby provide registration of the centerbody axis with that of the mixing chamber. Typically, the clearance around the base while seated in the recess is in the range of 0.006 to 0.007 inches. Also, preferably, the outer diameter of the centerbody base is less then the internal diameter of the outlet aperture 76 to facilitate removal of the centerbody through the aperture.

The centerbody base further includes one or more threaded holes 118 arranged in a quadrature array and positioned such that when the centerbody is seated in the interface recess 72 each threaded hole 118 is in register with a corresponding feed through hole 120 in the interface. Threaded bolts 122, which are inserted through the feed through holes 120 from the housing side of the interface, are threaded into the holes 118 and tightened so as to secure the base 98 in the recess 72, thereby rigidly fixing the centerbody in its axial position within the mixing chamber.

Washers 124 are used to prevent loosening of the bolts 122 under vibration. The washers are of a style referred to as "dog bone" which allows them to span a pair of adjacent bolts. This prevents rotation of the washer which may cause loosening of the bolts. Preferably, the washers include compression tabs which provide a tensile force against the bolt heads to protect against rotation of the bolts. To secure the centerbody in the interface recess the bolts and washers must be passed through the housing cavity (26, FIG. 1).

Figure 1B:
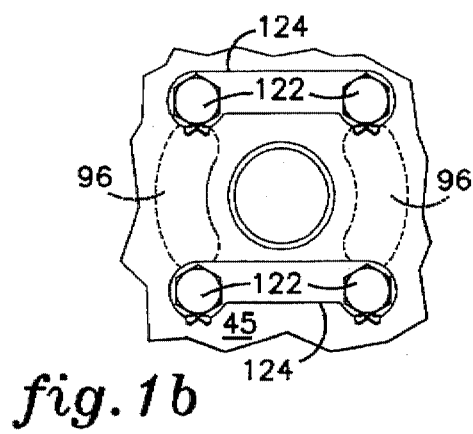
FIG. 1b is a sectioned view taken along the line 1b—1b of FIG. 1.
Figure 4:
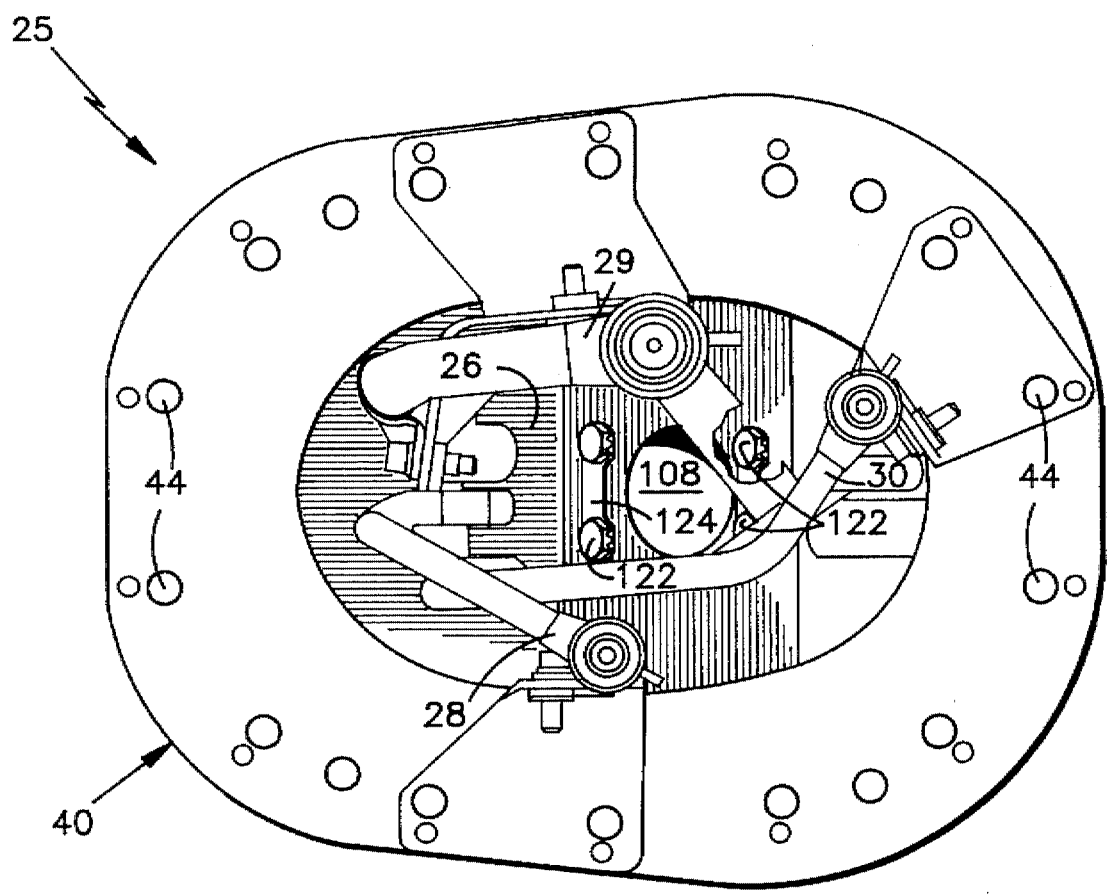
FIG. 4 is a plan view taken along the line 4—4 of FIG. 1.

FIG. 4 is a perspective view of the housing cavity taken along the line 4—4 of FIG. 1. It illustrates the access available to an operator through the fuel line arrangement in the cavity. A portion of the installed bolts 122 and washers 124 is visible, and to gauge location a portion of the fuel line 29 is shown broken away to locate a corner of the array. FIG. 1b is an elevation taken along the line 1b—1b of FIG. 1 showing the full array of the centerbody bolts and washers, which are located in a quadrature array corresponding to that of the threaded holes 118 in the centerbody base.

Referring simultaneously to FIGS. 1 and 2, as described hereinbefore, the nozzle assembly 10 is supported in position by the bolt mounted flange 40 of the housing is mounted to the engine casing, resulting in a cantilevered arrangement of nozzle and housing. The cantilever is supported at the nozzle end by support spars 126, which are mounted to the engine casing. In FIG. 1 the spar 126 is shown mounted between two sections of the engine casing. The spar attaches with bolts 128 to a bracket support 130 which extends upward toward the end cap 74. The bracket support includes mounting holes 132 which are adapted to slidably engage a bracket pin 133 disposed in a bracket 134. The bracket 134 is secured to mounting holes 135, 136 of the endcap 74.

To remove the centerbody from the nozzle 24, the nozzle assembly 10 must be removed from the engine. To do this the fuel lines are disconnected from their respective supply lines (not shown) and the bolts 44 are removed from the housing flange 40. The nozzle assembly may then be pulled through the engine casing, with the pin 133 on the nozzle end slidably releasing from the mounting hole 132.

With the nozzle assembly removed from the engine the centerbody may be separately removed from the swifter chamber 62 by releasing the bolts 122 from the centerbody base. The snug fit of the stub shaft with the interface aperture provides support after release of the bolts and the centerbody may be retrieved through the nozzle's outlet aperture 76.

Alternatively, the TE assembly may be separately removed by release of the bolts 80, allowing removal of the endcap 74 and swifter are scrolls 50, 52.

Although the invention has been shown and described with respect to a best mode embodiment thereof, it should be understood by those skilled in the art that various other changes, omissions, and additions may be made in the form and detail of the disclosed embodiment, without departing from the spirit and scope of the invention.

We claim:

1. A low $NO_x$ nozzle assembly for use in an industrial gas turbine engine, comprising:

a support fixture, including a housing having an internal cavity extending from an interface surface at one end of said housing to a mounting surface at a distal end thereof;

a tangential entry scroll swirler, comprising a centerbody positioned axially within a mixing chamber of an assembly formed by an endcap and a pair of arc scrolls, said endcap including an outlet aperture disposed in axial registration with said mixing chamber and having a first diameter, said assembly being removably engaged to a radially outward region of said interface surface and said centerbody being removably engaged, separate from said assembly, to a central region of said interface surface.

2. The assembly of claim 1, wherein:

said centerbody comprises a structural casing, with internal cavity, extending in an axial direction perpendicular to a first side surface of a base plate, a second side surface of said base plate having a stub shaft extending axially from a central portion thereof, in a direction diametrically opposed to said casing; and wherein said interface surface includes a mounting aperture disposed concentrically within a central portion of a larger diameter recess region formed in said interface surface, said aperture being adapted to receive insertion of said stub shaft in removable relationship therein, whereupon said centerbody is presented in axial registration with said mixing chamber.

3. The assembly of claim 2, wherein:

said interface surface further includes one or more feed through apertures disposed within said recess area for permitting the passing therethrough of a bolt shaft; and said second side surface of said base plate further includes one or more threaded holes, each related to a corresponding one of said feed through apertures and each disposed in said second side surface in a manner such that, with said stub shaft inserted into said mounting aperture, each is positioned in registration with said corresponding one of said feed through apertures; each said threaded hole being adapted to releasably engage threaded bolts received therein; and wherein said nozzle assembly further comprises threaded bolts adapted to be passed through said feed through apertures and engaged into said threaded holes thereby releasably mounting said centerbody to said interface surface.

4. The assembly of claim 1, wherein said interface surface further includes a plurality of threaded holes disposed in an array therein, each said interface threaded hole being adapted to releasably engage threaded bolts received therein; and wherein said arc scrolls and said endcap each include a plurality of feed through aperture therethrough, said endcap feed through apertures being in register with a corresponding one of said arc scroll feed through apertures, and each pair of said corresponding feed through apertures being in register with a related one of said interface threaded holes; and wherein said nozzle assembly further comprises a plurality of threaded bolts, one for each pair of said corresponding feed through apertures, each said bolt being adapted to be passed through said corresponding one of said feed through apertures and to engage a related one of said threaded holes, thereby releasably mounting said assembly to said interface surface.

* * * * *